(12) United States Patent
Suhling

(10) Patent No.: US 11,180,171 B1
(45) Date of Patent: Nov. 23, 2021

(54) MODULAR CONFIGURABLE MOBILE TRANSPORT APPARATUS

(71) Applicant: Robert James Suhling, Waukegan, IL (US)

(72) Inventor: Robert James Suhling, Waukegan, IL (US)

(*) Notice: Subject to any disclaimer, the term of this patent is extended or adjusted under 35 U.S.C. 154(b) by 0 days.

(21) Appl. No.: 16/928,628

(22) Filed: Jul. 14, 2020

(51) Int. Cl.
*B62B 1/12* (2006.01)
*B62B 5/06* (2006.01)
*B62B 1/14* (2006.01)
*B60C 7/10* (2006.01)
*B60C 7/04* (2006.01)
*B60C 7/06* (2006.01)

(52) U.S. Cl.
CPC .................. *B62B 1/14* (2013.01); *B62B 1/12* (2013.01); *B62B 5/06* (2013.01); *B60C 7/04* (2013.01); *B60C 7/06* (2013.01); *B60C 7/10* (2013.01)

(58) Field of Classification Search
CPC .... B62B 1/14; B62B 1/12; B62B 5/06; B60C 7/04; B60C 7/06; B60C 7/10
See application file for complete search history.

(56) References Cited

U.S. PATENT DOCUMENTS

| | | | | |
|---|---|---|---|---|
| 2,574,825 A | * | 11/1951 | Guild | ...................... B62B 1/264 414/456 |
| 3,247,989 A | * | 4/1966 | Uribe | ...................... B62B 1/264 414/456 |
| 3,338,586 A | * | 8/1967 | Kirlin | ...................... B62B 1/14 280/5.3 |
| 4,179,080 A | | 12/1979 | Patnaude | |
| 4,538,796 A | | 9/1985 | Steck | |
| 5,112,070 A | | 5/1992 | Hahn | |
| 5,362,194 A | | 11/1994 | Kassebaum | |
| 5,380,029 A | | 1/1995 | Portilla | |
| 5,984,326 A | | 11/1999 | Abraham | |
| 5,984,611 A | | 11/1999 | Warner | |
| 6,102,433 A | * | 8/2000 | Stevens | ................... B62B 1/125 280/47.29 |
| 6,398,235 B1 | * | 6/2002 | Cary | ....................... B25H 3/00 280/47.18 |

(Continued)

*Primary Examiner* — Bryan A Evans
(74) *Attorney, Agent, or Firm* — Lesavich High-Tech Law Group, S.C.; Stephen Lesavich

(57) ABSTRACT

A modular configurable mobile transport apparatus. A modular configurable mobile transport apparatus. The apparatus includes a first roller tip handle facing backwards for grasping the apparatus from behind providing horizontal stability for the apparatus and allowing the apparatus to be rolled on the first roller tip handle, a configurable backwards facing securing and storing portion for securing and storing one or more objects of varying widths to the back surface of the apparatus, a configurable backwards facing securing and storing portion for securing and storing one or more objects of varying widths to the front surface of the apparatus and a second roller tip handle facing forward for providing vertical stability for the apparatus and allowing the apparatus to be rolled on the second roller tip handle. The apparatus can be loaded with objects that are secured and stored on both the front side and back side of the apparatus and the apparatus can be rolled on its wheels and either of the first or second tip handles to allow easy movement and transport and insertion and removal into and out of vehicles.

20 Claims, 14 Drawing Sheets

(56) References Cited

U.S. PATENT DOCUMENTS

| | | |
|---|---|---|
| 6,695,325 B2 | 2/2004 | Carrillo |
| 7,066,477 B2 | 6/2006 | Dubois |
| 7,387,306 B2 | 6/2008 | Zimmer |
| 7,407,171 B2 | 8/2008 | Roberson |
| 7,857,328 B1 * | 12/2010 | Boss ................. B62B 1/14 280/47.25 |
| 8,016,303 B1 | 9/2011 | Ullman |
| 8,463,765 B2 | 6/2013 | Lesavich |
| 8,845,264 B2 | 9/2014 | Kubiak |
| 8,851,488 B2 | 10/2014 | Carruyo |
| 8,888,109 B2 | 11/2014 | Stubbs |
| 9,037,564 B2 | 5/2015 | Lesavich et al. |
| 9,120,495 B1 | 9/2015 | Anderson |
| 9,137,250 B2 | 9/2015 | Lesavich et al. |
| 9,216,752 B1 | 12/2015 | Carruyo |
| 9,361,479 B2 | 6/2016 | Lesavich et al. |
| 9,545,734 B2 | 1/2017 | Suhling |
| 9,569,771 B2 | 2/2017 | Lesavich et al. |
| 9,682,454 B2 | 6/2017 | Suhling |
| 9,688,298 B1 * | 6/2017 | Su ................. B62B 1/12 |
| 9,908,550 B2 | 3/2018 | Della Pora |
| 10,100,509 B2 | 10/2018 | Smith et al. |
| 10,245,653 B2 | 4/2019 | Suhling |
| 10,336,127 B1 | 7/2019 | Suhling |
| 2005/0127625 A1 | 6/2005 | Zimmer |
| 2005/0189738 A1 | 9/2005 | Roberson |
| 2011/0078857 A1 | 4/2011 | Kubiak |
| 2011/0208710 A1 | 8/2011 | Lesavich |
| 2012/0278622 A1 | 11/2012 | Lesavich et al. |
| 2013/0334783 A1 | 12/2013 | Carruyo |
| 2014/0189792 A1 | 7/2014 | Lesavich et al. |
| 2015/0298273 A1 | 10/2015 | Suhling |
| 2015/0306784 A1 | 10/2015 | Suhling |
| 2015/0379301 A1 | 12/2015 | Lesavich et al. |
| 2016/0075362 A1 | 3/2016 | Della Polla |
| 2016/0321654 A1 | 11/2016 | Lesavich et al. |
| 2016/0368515 A1 * | 12/2016 | Belotti ................. B62B 5/06 |
| 2018/0043439 A1 | 2/2018 | Suhling |
| 2019/0381614 A1 | 12/2019 | Suhling |
| 2019/0389500 A1 | 12/2019 | Suhling |
| 2020/0001495 A1 | 1/2020 | Suhling |

* cited by examiner

HORIZONTAL

SIDE

FRONT

HORIZONTAL

HORIZONTAL

MODULAR CONFIGURABLE MOBILE TRANSPORT APPARATUS

CROSS REFERENCE TO RELATED APPLICATIONS

Not applicable.

FIELD OF INVENTION

This application relates to work dollies for moving and transporting work tools and materials. More specifically, it relates to a modular configurable mobile transport apparatus.

BACKGROUND OF THE INVENTION

There are many types of mobile transport carts known as dollies and hand trucks. Dollies include a cart with small wheels for moving loads too heavy to be carried by hand.

The term "dolly" typically refers to a large number of different types of devices used to load and transport heavy objects such as boxes, tools, furniture. Basically, a dolly is an L-shaped platform or horizontal platform on wheels. Usually, the platform has one or two axles and two or four wheels in total, one on each corner. A two wheeled dolly is loaded on the L-shaped portion and tilted backward to move heavy objects.

A "hand truck," also known as a two wheeler, stack truck, trundler, box cart, sack harrow, cart, dolly, sack truck, or bag barrow, is an L-shaped object-moving handcart with handles at one end, wheels at the base, with a small ledge to set objects on, flat against the floor when the hand-truck is upright. The objects to be moved are tilted forward, the ledge is inserted underneath them, and the objects allowed to tilt back and rest on the ledge. The truck and objects are then tilted backward until the weight is balanced over the wheels, making otherwise bulky and heavy objects easier to move.

There are a number of problems associated with dollies and hand trucks know in the art. One problem is that dollies and hand trucks known in the art can only be loaded on the front L-shaped component and cannot be loaded on a back side.

Another problem with dollies and hand trucks known in the art is that the front L-shaped portion of the dolly cannot be used to secure and store any objects without requiring additional components such as rope, cables, straps, bungee chords, etc.

Another problem with dollies and hand trucks known in the art is that a back portion of the dolly or hand truck cannot be used to secure and store any objects.

Another problem with dollies and hand trucks known in the art is that even if a load is secured to front L-shaped portion of the dolly, the dolly or hand truck cannot be easily slide into and out of a vehicle in a loaded configuration.

Another problem with dollies and hand trucks known in the art is that the dolly or hand truck in a loaded configuration is not horizontally stable.

Another problem with dollies and hand trucks known in the art is that the dolly or hand truck is only moveable via its wheels.

Another problem with dollies and hand trucks known in the art is that they are not configure to secure, store and transport common tools used in the construction, maintenance, manufacturing, etc. industries.

Another problem with dollies and hand trucks known in the art is that even when placed in a horizontal position any common tools used in the construction, maintenance, manufacturing, etc. industries would not be at an appropriate height for easy use.

Another problem is that components of dollies and land trucks known in the art is that components of the dollies and hand trucks are attachable, re-attachable or moveable.

Thus, it is desirable to solve some of the common problems associated with dollies and hand trucks known in the art.

SUMMARY OF THE INVENTION

In accordance with preferred embodiments of the present invention, some of the problems associated dollies and hand trucks are overcome. A modular configurable mobile transport apparatus.

A modular configurable mobile transport apparatus. The apparatus includes a first roller handle facing backwards for grasping the apparatus from behind providing horizontal stability for the apparatus and allowing the apparatus to be rolled on the first roller handle, a configurable backwards facing securing and storing portion for securing and storing one or more objects of varying widths to the back surface of the apparatus, a configurable backwards facing securing and storing portion for securing and storing one or more objects of varying widths to the front surface of the apparatus and a second roller handle facing forward for providing vertical stability for the apparatus and allowing the apparatus to be rolled on the second roller handle. The apparatus can be loaded with objects that are secured and stored on both the front side and back side of the apparatus and the apparatus can be rolled on its wheels and either of the first or second tip handles to allow easy movement and transport and insertion and removal into and out of vehicles.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Modular Configurable Mobile Transport Apparatus

Figure 1:
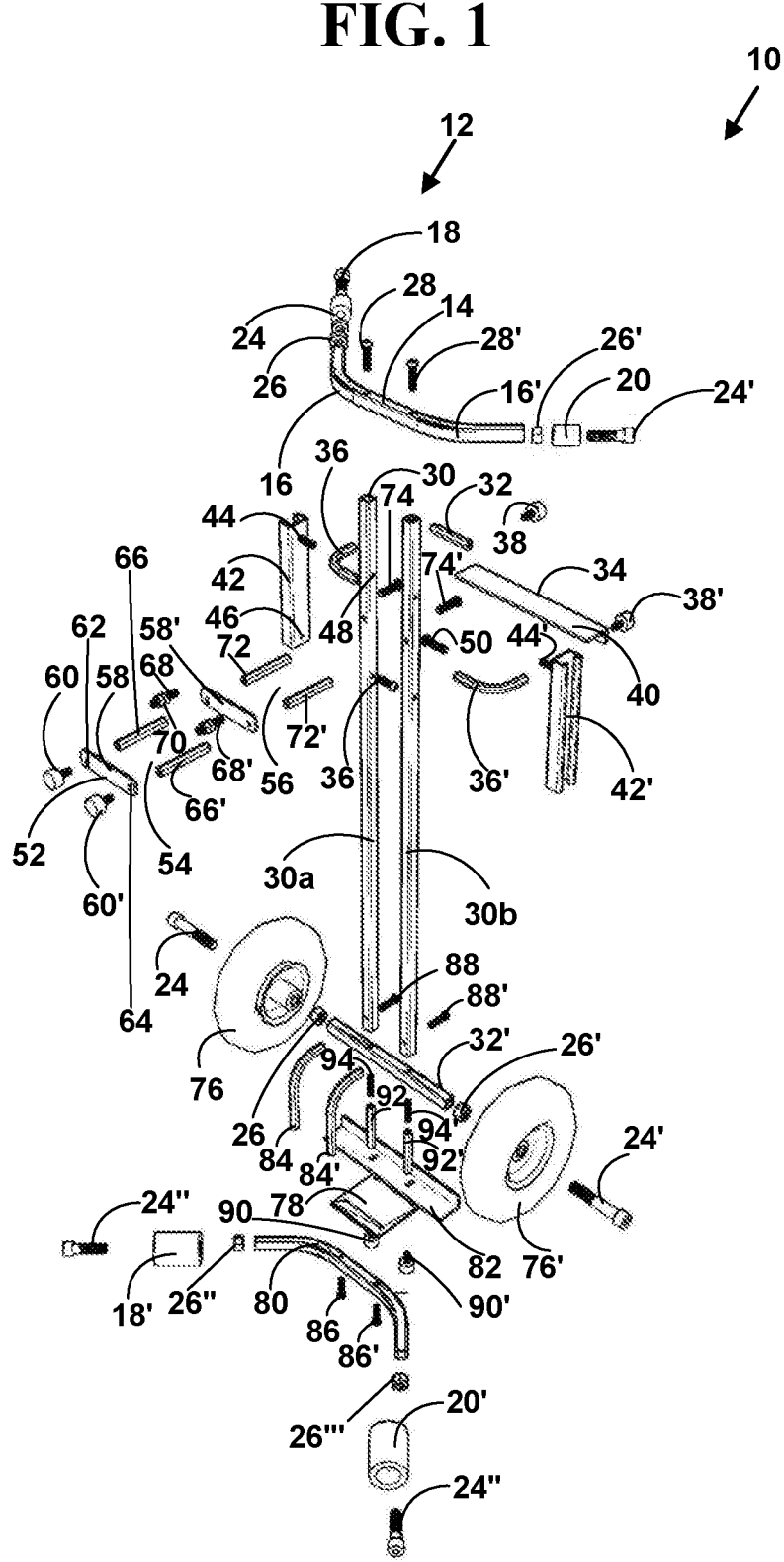
FIG. 1 is a block diagram illustrating an exploded view of an exemplary modular configurable mobile transport apparatus.

FIG. 1 is a block diagram 10 illustrating an exploded view of an exemplary modular configurable mobile transport apparatus 12.

The apparatus 12 includes a first roller handle 14 connected to a top portion of a main body portion of the apparatus 12, extending backwards from the apparatus 12, including a bend at a pre-determined angle at both a first end 16 and a second end 16' for grasping the apparatus 12 from behind when the apparatus 12 is moved and for keeping the apparatus 12 level on a horizontal surface (See FIG. 12), a first roller portion 18 at the first end of the roller handle body portion 16 and second roller portion 20 at the second end of the roller handle body portion 16' for allowing the apparatus 12 to be rolled upon the first roller portion 18 and the second roller portion 20 of first roller handle 14.

In an exemplary embodiment, the pre-determined angle includes at least an angle of about forty-five degrees measured from a horizontal plane. However, the present invention is not limited to this embodiment and other pre-determined angles can be used to practice the invention.

Figure 11:
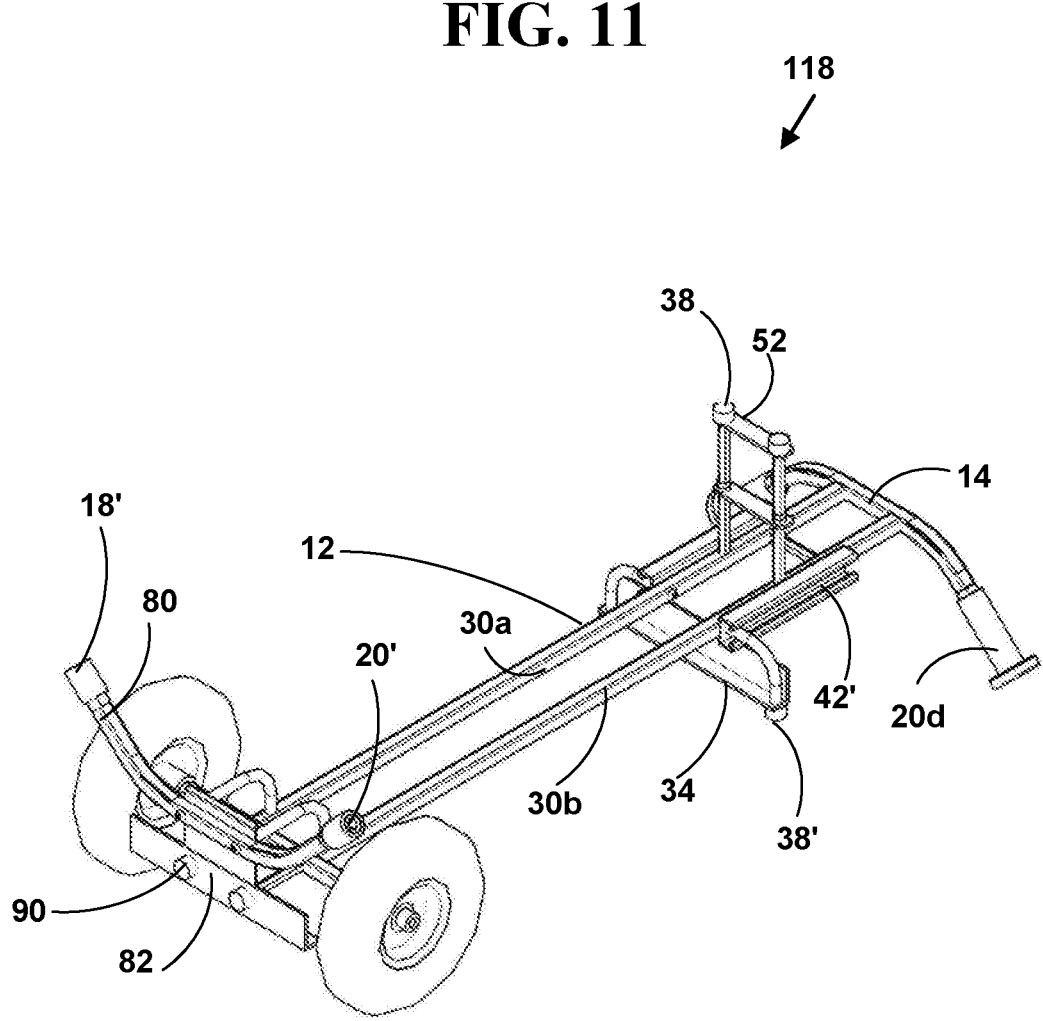
FIG. 11 is a block diagram illustrating a horizontal perspective view of an exemplary modular configurable mobile transport apparatus.
Figure 12:
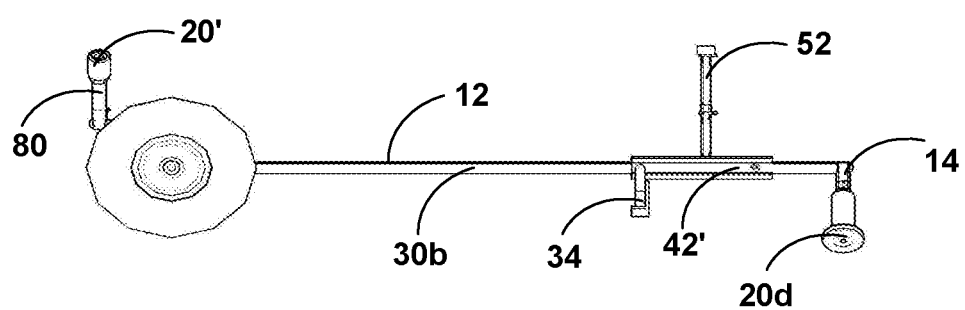
FIG. 12 is a block diagram illustrating a side horizontal view of an exemplary modular configurable mobile transport apparatus.
Figure 15:
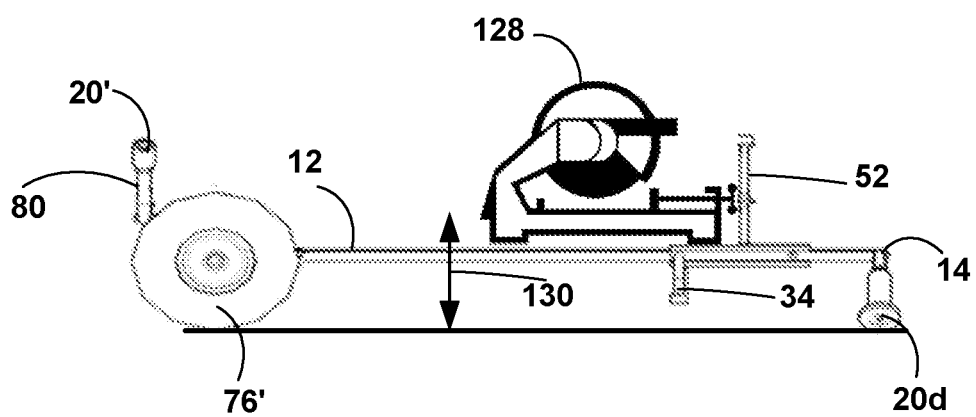
FIG. 15 is a block diagram illustrating a side horizontal view of an exemplary modular configurable mobile transport apparatus including a cutting saw tool resting on a backwards facing roller tip handle.

In one exemplary embodiment, a selected pre-determined angle (e.g., about eighty-five degrees) of the first roller handle 14 along with wheels 76, 76' of a coordinated size provides a work surface for tools attached to the apparatus 12 at an appropriate height 130 (FIGS. 15 and 16) for easy use when the apparatus 12 is placed in a horizontal configuration resting on the first roller handle 14 (See FIGS. 11, 12 and 15).

Figure 2:
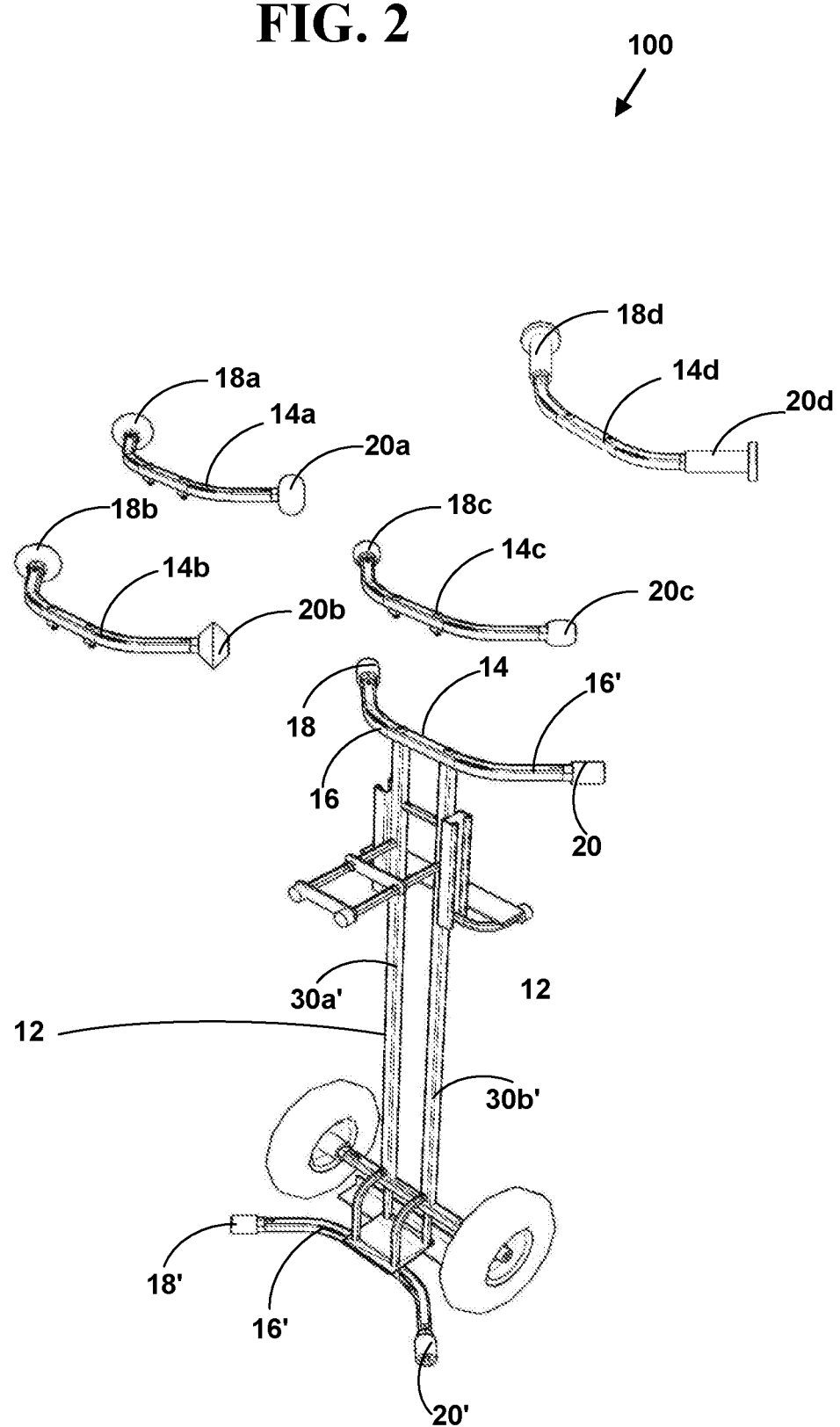
FIG. 2 is a block diagram illustrating a perspective view of an exemplary modular configurable mobile transport apparatus first roller handle.

FIG. 2 is a block diagram 100 illustrating a perspective view of an exemplary modular configurable mobile transport apparatus 12 first roller handle 14.

In an exemplary embodiment, the first roller portion 18 and the second roller portion 20 of the first roller handle 14 and the second roller handle 80 include roller spindles 18, 20 including a round 18, 20, spherical 18a, 20a, conical 18b, 20b, oval 18c, 20c and/or a roller grip, palm protector 18d, 20d, shape.

However, the present invention is not limited to this embodiment and other shapes for the first roller portion 18 and second roller portion 20 can be used to practice the invention.

Figure 3:
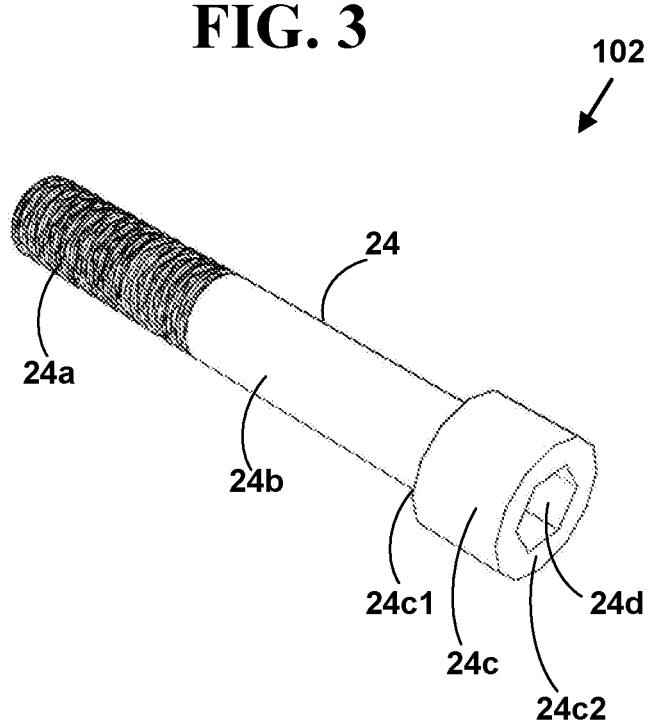
FIG. 3 is a block diagram illustrating a perspective view of an exemplary roller portion connector means.

FIG. 3 is a block diagram 102 illustrating a perspective view of an exemplary roller portion connector means 24.

The first roller handle 14 further includes a first roller portion 18 connector means 24 including a threaded bolt 24 with a threaded portion 24a (FIG. 3) and a non-threaded portion 24b and a threaded nut 26 that are accepted into a threaded receptacle in the first end of the roller handle body portion 16. A first end of the threaded bolt 24 accepts the nut 26 on the threaded portion 24a and is accepted into the threaded receptacle in the first end of the roller handle body portion 16, 16'. The non-threaded portion 24b provides a smooth spindle surface for the first roller portion 18 to rotate three-hundred sixty (360) degrees around. A second connector means 24' for second roller portion 20 is identical to the first connector means 24.

In one embodiment, the roller portion connector means 24 includes a second head end 24c with hexagonal socket 24d. Hexagonal sockets 24d are used with a hex key, Allen wrench or Allen key, a tool used to insert and remove screws with hexagonal sockets in their heads. However, the present invention is not limited to such and embodiment and other types of connector means with other heads can be used to practice the invention.

Figure 4:
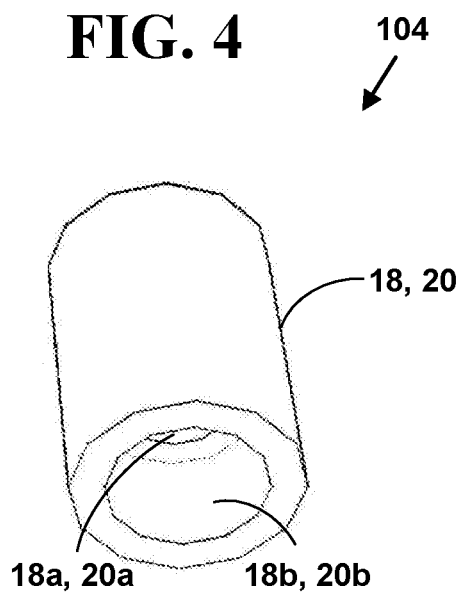
FIG. 4 is a block diagram illustrating a perspective view of an exemplary roller portion.

FIG. 4 is a block diagram 104 illustrating a perspective view of an exemplary roller portion 18, 20.

In an exemplary embodiment, the first roller portion 18 and the second roller portion 20 include a first portion of an internal surface 18a, 20a that is counter bored including a first smaller diameter that fits around the non-threaded portion 24b of the connecter means 24 and provides a smooth inner surface for the first and second roller portions 18, 20 to rotate three-hundred sixty (360) degrees around non-threaded spindle portion 24b of the first roller connection means 24.

The first roller portion 18 and second roller portion 20 further include a second larger diameter portion of an internal surface 18b, 20b that engages an inner end 24c1 of the second hex head end 24c of the connector means 24 to prevent the first roller portion 18 and second roller portion 20 from slipping off the first roller handle body portion 16 and the second roller handle body portion 16' of the first roller handle 14.

However, the present invention is not limited to such embodiment and other types of connector means and inner surfaces and types of the roller means can be used to practice the invention.

Figure 5:
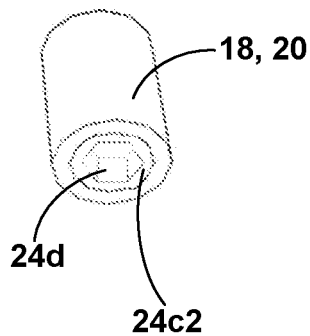
FIG. 5 is a block diagram illustrating a perspective view of an exemplary roller portion and roller portion connection means.

FIG. 5 is a block diagram 106 illustrating a perspective view of an exemplary roller portion 18, 20 and roller portion connection means 24.

In one embodiment, the outer edge of the first roller portion 18 aligns flush with an outer end 24c2 of the second hex head end 24c of the connector means 24. This prevents the connector means 24 of the apparatus 12 from snagging on clothes of a user, other portion of the user, a portion of a vehicle for the user which accepts the apparatus 12 for transport (e.g., a bed of a pickup truck, etc.) or a flat horizontal surface on which the apparatus 12 is placed in a horizontal configuration.

However, the present invention is not limited to such embodiment and other types of connector means and inner surfaces and types of the roller means can be used to practice the invention.

In one exemplary embodiment, the second roller portion 20 includes identical inner counter bored surfaces 20a, 20b and identical connector means 24', 26' as attached to the second roller handle body portion 16' and operates in an identical manner as the first roller portion 18 does.

However, the present invention is not limited to such an embodiment and the second roller portion 20 is not identical to the first roller portion 18 and other types of roller portions with other configurations can be used to practice the invention.

In one exemplary embodiment, the first roller handle body portion 16 includes a first roller portion 18 that spans a whole length and/or at least 50% of the first roller handle body portion 16 instead of just including a roller tip portion and the first roller handle body portion 16' includes a another roller portion that spans a whole length and/or 50% of the first roller body portion 16' instead of just including a roller tip portion 20. In another embodiment, the first roller portion 18 spans the whole length of the first roller handle body portion 16 and the first roller handle body portion 16' includes only a roller tip portion 20. In another embodiment, first roller handle body portion 16 includes only roller tip portion 18 and the first roller handle body portion 16' includes a roller tip portion 20 that spans the whole length of the first roller handle body portion 16'. However, the present invention is not limited to such an embodiments and other embodiments with other combinations of full roller handles, full roller handle lengths and roller tip handles can be used to practice the invention.

Returning to FIG. 1, the first roller handle 14 is connected with two attachment means 28, 28' to a top portion of a main configurable body portion 30 of the apparatus 12.

In one exemplary embodiment, the attachments means 28, 28' are threaded bolts that are accepted into threaded receptacles on the top portion of the main configurable body portion 30 of the apparatus 12. In this embodiment two attachment means 28, 28' are used. However, the present invention is not limited to such an embodiment, and more, fewer and/or other types of attachment means can be used to practice the invention.

In one embodiment the attachment means 28, 28' also include shoulder bolts, shoulder pins, and/or threaded rods with nyloc nuts, lock nuts, double nuts and/or jam nuts, etc. A "jam nut" is a low profile type of nut, typically half as tall as a standard nut. It is commonly used as a type of locknut, where it is "jammed" up against a standard nut to lock the two in place. A "nyloc nut," also referred to as a nylon-insert lock nut, polymer-insert lock nut, or elastic stop nut, is a kind of locknut with a nylon collar that increases friction on the screw thread. However, the present invention is not limited to such an embodiment and other bolts, pins, rods and nuts can be used as attachment means to practice the invention.

The main configurable body portion 30 further includes plural horizontal support structures 32, 32' (only two of which are illustrated in FIGS. 1 and 2, which provide additional lateral support to the apparatus 12.

In one embodiment, the plural horizontal support structures 32, 32' include a pre-determined length to accommodate a width of common tools (e.g., saws, etc.) used in the construction, maintenance, manufacturing, etc. industries. Specifically axle 32' includes a pre-determined length long enough to accommodate a width of common tools (e.g., saws, drill presses, etc.) so the tools are stored and secured between the wheels 76, 76' of the apparatus without the wheels 76, 76' rubbing on the tools.

As is illustrated in FIGS. 1 and 2 the main configurable body portion 30 includes plural (i.e., two or more) first vertical support portions 30a, 30b of a first pre-determined length. For example, the pre-determined length includes about forty inches (about 102 centimeters (cm)) to allow the apparatus 12 to be a standard sized dolly.

However, the present invention is not limited to such an embodiment and other first pre-determined lengths can be used to practice the invention.

The plural of first support vertical support portions 30a, 30b are replaceable with other vertical support portions 30a' and 30b' (FIG. 2) of other pre-determined lengths (e.g., longer or shorter than 40 inches, etc.) to re-configure the apparatus 12 to transport objects of different lengths and tools of varying weights.

In FIGS. 1 and 2, the first vertical support portions 30a, 30b and other vertical support structures 30a', 30b' are illustrated as two vertical support structures, which are hollow and include a square shape. Hollow vertical support structures 30a' and 30b' make the apparatus 12 lighter in weight and cheaper to build than if solid vertical support structures are used. However, the present invention is not limited to such an embodiment and more than two vertical support structures, solid vertical support structures and vertical support structures of other shapes (e.g., circular, oval, rectangle, polygon, etc.) can be used to practice the invention.

For example, if the apparatus 12 is being used to transport a very heavy tool (e.g., heavy wood or metal cutting saw, etc.), then the vertical support portions may include, three, four, etc. vertical support portions. In another embodiment, only one vertical support structure 30 is used. However, the present invention is not limited to such an embodiment.

The main configurable body portion 30 provides the advantage of being flexible and configurable for different situations in which the apparatus 12 is being used to transport materials and/or tools of a heavy weight and/or tools and/or materials of a long length.

In one exemplary embodiment, the plural first vertical support portions 30a, 30b of the main configurable body portion 30 include plural receptacles at different distances on the front, back and side surface portions to attach the plural first vertical support portions 30a, 30b of the main configurable body portion 30 to attach the configurable backward facing securing and storage portion 34 and the configurable forward facing securing and storing portion 52 at different distances on the plural first vertical support portions 30a, 30b of the main configurable body portion 30 to accommodate different sized and shaped objects shaped objects (e.g., tools, materials such as wood, metal, etc. etc.). However, the present invention is not limited to this embodiment and other embodiments can be used to practice the invention.

Returning to FIG. 1 the apparatus 12, further includes a moveable backwards facing securing and storing portion 34 extending backwards from a back portion of main configurable body portion 30 of the apparatus 12 for securing one or more objects of varying widths to the back portion of the plural first vertical support portions 30a, 30b of the main configurable body portion 30.

In an exemplary embodiment, the moveable backwards facing securing and storing portion 34 includes a first securing arm 36 connected to the first vertical support portion 30a and second securing arm 36' the second vertical support portion 30b of the main configurable body portion 30. The first securing arm 36 and the second securing arm 36' include threaded receptacles at both ends including a first receptacle for accepting a first securing arm attachment means 36 and a second securing attachment means 36' and a second receptacle for accepting a first securing adjustment nob 38 and a second securing adjustment nob 38'. The moveable backwards facing securing portion 34 further includes an angled plate portion 40 which is moved backwards and forwards by rotating the first securing adjustment nob 38 and the second securing adjustment nob 38' inwards and outwards towards and away from the back portion of the plural first vertical support portions 30a, 30b of the main configurable body portion 30.

In one embodiment, the angled plate portion 40 includes a ninety degree angle. However, the present invention is not limited to such an embodiment and other angles can be used to practice the invention. In such an embodiment, a back surface portion of the angled plate portion 40 engages a front surface portion of an object to be transported on the back side of the apparatus 12. The moveable backwards facing securing and storing portion 34 allows objects (e.g., materials, tools, etc.) of varying widths and/or multiple objects to be secured on the back side of the apparatus 12 for transport.

In FIG. 1, the moveable backwards facing securing and storing portion 34 is illustrated as an open sided securing and storing portion. In another embodiment, the moveable backwards facing securing and storing portion 34 further includes a closed-sided container. However, the present invention is not limited to such an embodiment and other embodiment can be used to practice the invention.

The apparatus further includes one or more strut side rails 42, 42' (only two of which are illustrated in FIGS. 1 and 2) connected to one or more side portions the plural first vertical support portions 30a, 30b of the main configurable body portion 30 for accepting a work-stop apparatus for accepting and applying pressure to an end of an object to be cut on the apparatus 12. In another embodiment, the one or more strut side rails 42, 42' include any type of rails to attached additional clamps, brackets and/or tools. However, the present invention is not limited to such an embodiment and other embodiments can be used to practice the invention.

In one embodiment, the work-stop apparatus includes one or more reversible flip-away work stop for strut systems described in co-pending U.S. utility application Ser. No. 16/905,360, filed by the same Applicant as for the present patent application. However, the present invention is not limited to such an embodiment and other embodiments can be used to practice the invention.

FIGS. 1 and 2 illustrate the one or more strut side rails 42, 42' including a short length, a length shorter than the pre-determined length of the plural first vertical support portions 30a, 30b of the main configurable body portion 30. However, the present invention is not limited to this embodiment and other lengths for the one or more strut side rails 42, 42' can be used to practice the invention.

The one or more strut side rails 42, 42' further include plural hollow integral side rail attachment means, 44, 44' and a side rail receptacle 46 (only one of which is visible in FIG. 1) to secure the one or more strut side rails 42, 42' to the plural first vertical support portions 30a, 30b of the main configurable body portion 30.

In one exemplary embodiment, the first hollow integral side rail attachment means 44 is inserted through a first receptacle 48 in a first side portion of first vertical support portion 30a of the main configurable body portion 30 and the second hollow integral side raid attachments means 44' is inserted through a second receptacle 48' in a second side portion in a second end of the second vertical support portion 30b. A second side rail attachment means 50 (only one of which is illustrated) is inserted through the second hollow integral side rail attachment means 44' into the second receptacle in the second side portion of first vertical support portion 30b of the main configurable body portion 30 and another second side rail attachment means 50 is inserted through the first hollow integral side rail attachments means 44 in the first receptacle in the first side portion of the first vertical support portion 30a of the main configurable body portion 30.

In one exemplary embodiment, the second side rail attachment means 50 includes a thread bolt. However, the present invention is not limited to such an embodiment and other attachments means 50 can be used to practice the invention.

As was described above, the first securing arm 36 and the second securing arm 36' include threaded receptacles at both ends, a first receptacle for accepting a first securing arm attachment means 38 and a second securing attachment means 38'. In one embodiment, first securing arm attachment means 38 is placed through first side rail receptacle 46 of the first strut side rail 42 and the second securing arm attachment means is placed through the second side rail receptacle of the second strut side rail 42' to secure both side rails 42, 42' to the vertical support portions 30a, 30b of the main configurable body portion 30. However, the present invention is not limited to such an embodiment and other embodiments and attachment methods can be used to practice the invention.

The apparatus 12 further includes a configurable forward facing securing and storing portion 52 extending forwards from a front portion of the plural first vertical support portions 30a, 30b of the main configurable body portion 30 of the apparatus 12 for securing and storing one or more objects to the front portion of the plural first vertical support portions 30a, 30b of the main configurable body portion 30 of the apparatus 12.

The configurable forward facing securing and storing portion 52 including a first storage portion 54 for securing one or more objects of varying widths to the front portion of the plural first vertical support portions 30a, 30b of the main configurable body portion 30 and a second storage portion 56 of a pre-determined fixed size to one or more other objects to the front portion of the plural first vertical support portions 30a, 30b of the main configurable body portion 30 of the apparatus 12.

Figure 6:
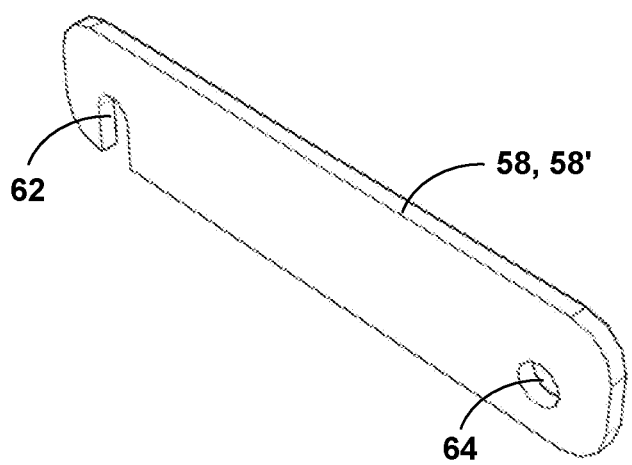
FIG. 6 is a block diagram illustrating a perspective view of an exemplary latch plate.

FIG. 6 is a block diagram 108 illustrating a perspective view of an exemplary latch plate 58.

The configurable forward facing securing and storing portion 52 includes a first latch plate 58, one or more latch plate adjustment nobs 60, 60' (two of which are illustrated). The first latch plate 58 and second latch plate 58' includes a first latch receptacle notch 62 for accepting a first adjustment nob 60 and a second latch receptacle 64 for accepting the second adjustment nob 60'. The first latch plate 58 and second latch plate are movable and rotatable in a rotational motion up to about two hundred seventy degrees around the second adjustment nob 60'.

The first latch plate adjustment nob 60 secures the first latch plate 58 via the first latch receptacle notch 62. The latch plate adjustment nobs 60, 60' are moved in to secure the first latch plate 58 and out to unsecure the first latch plate 58 and secure the latch plate against one or more objects stored in the first dynamic securing portion 56 of the configurable forward facing securing and storing portion 52.

Figure 7:
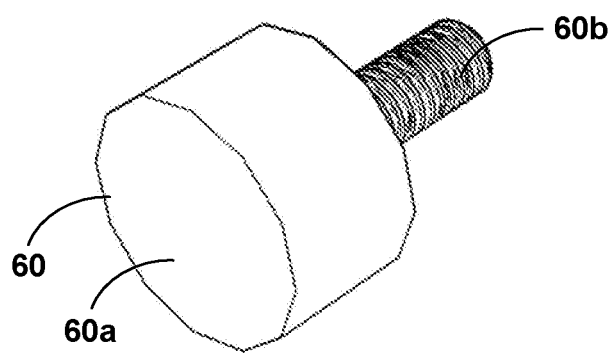
FIG. 7 is a block diagram illustrating a perspective view of an exemplary a latch plate adjustment nob.

FIG. 7 is a block diagram 110 illustrating a perspective view of an exemplary a latch plate 58, 58' adjustment nob 60.

The one or more latch plate adjustment nobs 60, 60' include a first round nob portion 60a and a second threaded portion 60b. The second threaded portions 60b are inserted into a first threaded receptacle of a first end of first threaded receptacle connectors 66, 66'. The second end of the first threaded receptacle connectors 66, 66' are inserted into a first end of a threaded rod 68, 68' including one or more nuts 70 to engage and secure a front surface of the second latch plate 58'. The one or more nuts 70 also provide a separator between the first storage portion 54 and the second storage portion 56. The second end of the threaded rods 68, 68' are connected to a first end of second threaded receptacle connectors 72, 72'. Latch plate connections means 74, 74' are connected into a second end the second threaded receptacle connectors 72, 72' via the back surface portion of the first vertical support portions 30a, 30b of the main configurable body portion 30 of the apparatus 12.

Rotating the second latch plate 58' up and away from the configurable forward facing securing and storing portion 52 by about one hundred eighty degrees provides a forward facing storage space area including both the first pre-determined storage space area and the second pre-determined storage space area.

In one exemplary embodiment, the latch plate latch plate adjustment nobs 60, 60' are replaced with threaded bolts with hex heads and/or other types of bolts, pins, etc. However, the present invention is not limited to such an embodiment and other embodiments can be used to practice the invention.

In one exemplary embodiment, the first pre-determined storage area 54 and the second pre-determined storage area 56 includes identical size storage areas. In another exemplary embodiment, the first pre-determined storage area 54 and the second pre-determined storage area 56 includes different size storage areas.

In one exemplary embodiment, to change a size of the first pre-determined storage area 54 and/or the second pre-determined storage area 56, the lengths of the first threaded receptacle connectors 66, 66' and/or the second threaded receptacle connectors 72, 72' are adjusted to longer or shorter sizes.

In one exemplary embodiment, the first pre-determined storage area and the second pre-determined storage area include a storage space area including about four inches (about 10 cm) by about four inches (about 10 cm) in size for a total storage space area of about sixteen square inches (about 100 square cm). However, the present invention is not limited to such an embodiment and other storage space area sizes can be used to practice the invention.

In FIG. 1, the forward facing securing and storing portion 52 is illustrated as an open sided securing and storing portion. In another embodiment, the forward facing securing and storing portion 52 further includes a closed-sided container. However, the present invention is not limited to such an embodiment and other embodiment can be used to practice the invention.

The apparatus 12 further includes an axle 32' (one of the plural horizontal support structures 32') connected to a bottom portion surface of the plural first vertical support portions 30a, 30b of the main configurable body portion 30. Two wheels including a first wheel 76 connected to a left side portion of the axle 32' and a second wheel 76' connected to a right side portion of the axle 32' for allowing the apparatus to be rolled along the horizontal surface. In an exemplary embodiment, the horizontal surface includes horizontal angles from zero degrees to eight-nine degrees on a horizontal plane.

The wheels 76, 76' are connected to the axle 32' with connector means 24, 24' (FIG. 3) including a threaded bolt 24 with a threaded portion 24a and a non-threaded portion 24b and a threaded nut 26, 26'. The non-threaded portion 24b provides a spindle portion that allows the wheels 76, 76' to rotate three hundred sixty degrees around the connector means 24, 24'. The threaded nut 26, 26' provides a spacer to allow the wheels 76, 76' to be spaced outside a typical distance of common objects transported with the apparatus 12 (e.g., a typical width of tools (e.g., a base of a cutting saw, etc.) and materials (e.g., wood, metal, etc.).

In one embodiment, the wheels 76, 76' are connected to the axle 32' with connector means 24, 24' (FIG. 3), the same connector means used to connect first roller tip handle 14 and second roller tip handle 80. This provides the advantage of the apparatus having additional common parts to reduce its complexity and cost. However, the present invention is not limited to such an embodiment and other embodiments with different parts can be used to practice the invention.

In FIGS. 1 and 2, the wheels 76, 76' are illustrated with solid rims. In one embodiment, the wheels 76, 76' include tires with tubes. In another embodiment, the wheels 76, 76' include tubeless tires. In another embodiment, the wheels 76, 76' include solid tires made from rubber, plastic, metal, wood, composite materials or other materials. In another embodiment, the wheels 76, 76' include pneumatic tires. There are two types of pneumatic tires, solid pneumatics and air pneumatics. The air pneumatics are filled with air, while the solid pneumatics are made of rubber and more puncture proof in environments with nails, rocks, or other sharp objects around a workspace. In another embodiment, the wheels 76, 76' include wheels with spoked rims. The spoked rims include any of the types of tires just described herein.

However, the present invention is not limited to these embodiment and other configurations of the axel and wheels can be used to practice the invention.

The apparatus 12 further includes a foot plate 78 with four receptacles connected to a top surface portion of a second roller tip handle 80. The second roller tip handle 80 connected to a bottom surface portion of the foot plate 78.

In one exemplary embodiment, the storage area of the foot plate 78 is the same as the area of the second storage portion 56 and provides a bottom storage surface for objects stored in the second storage portion 56 of the configurable forward facing securing and storing portion 52. In another embodiment, the storage area of the foot plate 78 is larger or smaller than the area of the second storage portion 56 of the configurable forward facing securing and storing portion 52. However, the present invention is not limited to these embodiments and other embodiments can be used to practice the invention.

In one exemplary embodiment, the foot plate 78 provides additional horizontal stability for the apparatus 12. In one embodiment, the foot plate 78 is similar to the L-shape portion of a conventional dolly and/or hand truck.

The foot plate 78 is connected on a top surface portion through two front receptacles on the foot plate 78 to a first end of a third securing arm attachment means 84 and a first end of a fourth securing attachment means 84'.

The third securing arm 84 and the fourth securing arm 84' include threaded receptacles at both ends including a first threaded receptacle end for accepting a second roller tip handle 80 connection means 86, 86' and a second threaded receptacle end for accepting a second main configurable body portion 30 connection means 88, 88' for connecting the front surface portion of the first vertical support portions 30a, 30b of the second main configurable body portion 30 to third securing arm 84 and the fourth securing arm 84'.

In one embodiment the third securing arm 84 and the fourth securing arm 84' are a same size and shape as the first securing arm 36 and the second securing 36'. This provides the advantage of the apparatus 12 having common parts.

The second roller tip handle 80 extends forward from the apparatus 12, including a bend at a pre-determined angle at both a first end 80a and a second end 80b of the second roller tip handle 80. The second roller tip handle 80 providing additional vertical position support for the apparatus 12 and allowing the apparatus to be rolled on be rolled upon the first roller portion 18' and the second roller portion 20' of second roller tip handle 80. The first roller portion 18' and the second roller portion 20' of second roller tip handle 80 allow the apparatus to be rolled without using wheels 76, 76' and/or to be rolled into a vehicle in a forward facing position.

In an exemplary embodiment, the pre-determined angle of the second roller tip handle 80 includes at least an angle of forty-five degrees measured from a horizontal plane. However, the present invention is not limited to this embodiment and other pre-determined angles can be used to practice the invention.

In one exemplary embodiment the pre-determined angle of the second roller tip handle 80 is the same as the first roller handle 14. In another embodiment, the pre-determined angle of the second roller tip handle 80 is the different than the first roller handle 14. However, the present invention is not limited to these embodiments and other embodiments may be used to practice the invention.

In one exemplary embodiment, the second roller tip handle 80 includes the same size first and second roller portions 18', 20' as the first roller handle 14 (FIGS. 1, 2, 10, 13 and 14). In another embodiment, the second roller tip handle 80 includes different sized and shape first and second roller portions 18a, 20a, 18b, 20b, 18c, 20c, 18d, 20d (FIGS. 2, 9, 11, 12 and 15) than the first roller handle 14. However, the present invention is not limited to these embodiments and other embodiments can be used to practice the invention.

The apparatus 12 further includes the backward facing adjustable bracket 82 adjustable inwards and outwards from a back side portion of the apparatus 12.

The backward facing adjustable bracket 82 providing an adjustable bottom surface portion for the one or more objects stored in the configurable backwards facing securing and storing portion 34 for securing a bottom end of the one or more objects of varying widths to the back surface portion of the apparatus 12.

The backward facing adjustable bracket 82 is attached to a top surface of the foot plate 78 through another two receptacles in the foot plate 78 with two backward facing adjustable bracket 82 attachment means 90, 90'.

In one exemplary embodiment, the two backward facing adjustable bracket 82 attachment means 90, 90' include adjustable threaded nobs. In another embodiment, the two backward facing adjustable bracket 82 attachment means 90, 90' include threaded bolts. However, the present invention is not limited to these embodiments and other embodiments can be used to practice the invention.

In one exemplary embodiment, the threaded ends of the two backward facing adjustable bracket 82 attachment means 90, 90' adjustable threaded nobs are connected to first ends of two threaded support receptacles 92, 92'. The second ends of the two threaded support receptacles 92, 92' are connected to a first end of threaded axle attachment means 94, 94'. The second end of the threaded axle attachment means 94, 94' is connected to a bottom surface portion of the axle 32'.

In one exemplary embodiment, the threaded axle attachment means 94, 94' is a threaded rod. However, the present invention is not limited to such an embodiment, and other embodiments can be used to practice the invention.

Figure 8:
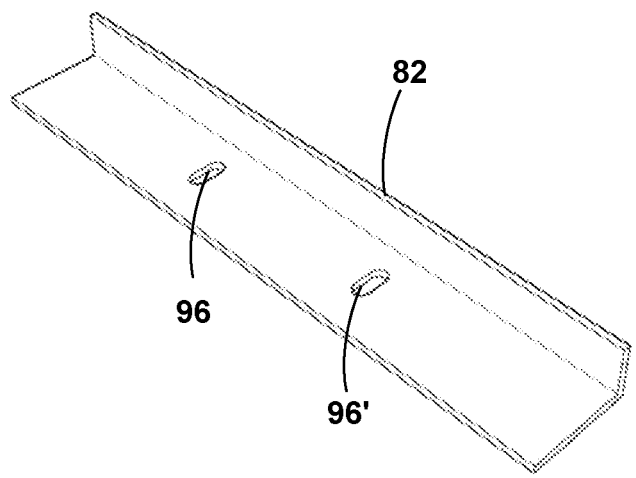
FIG. 8 is a block diagram illustrating a perspective view of an exemplary backward facing adjustable bracket.

FIG. 8 is a block diagram 112 illustrating a perspective view of an exemplary backward facing adjustable bracket 78.

The backward facing adjustable bracket 78 includes two elongated receptacles 96, 96' allowing the backward facing adjustable bracket 78 to be moved outward and inward to secure objects of varying widths. However, the present invention is not limited to such an embodiment and other embodiments can be used to practice the invention.

Figure 9:
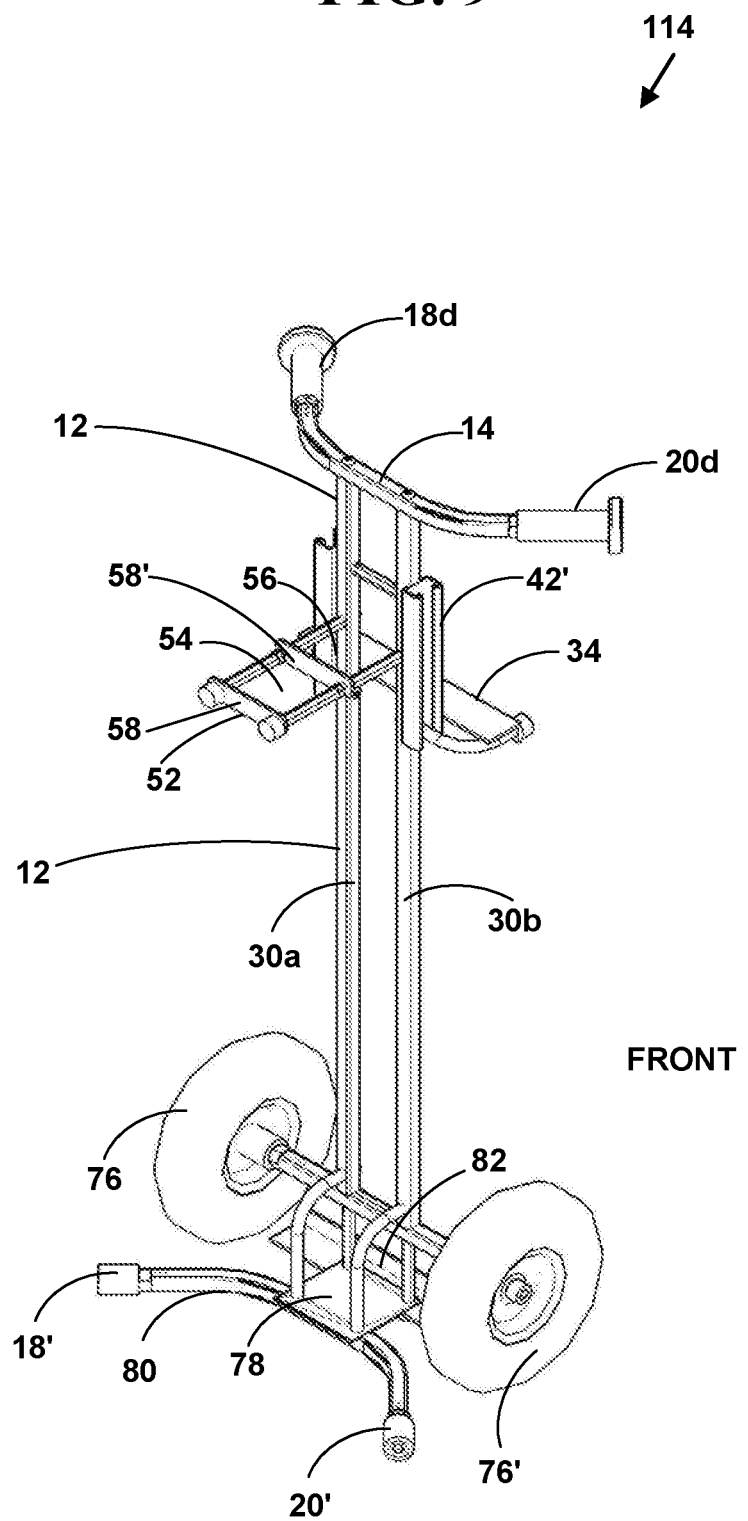
FIG. 9 is a block diagram illustrating a front perspective view of an exemplary modular configurable mobile transport apparatus.

FIG. 9 is a block diagram 114 illustrating a front perspective view of an exemplary modular configurable mobile transport apparatus 12.

Figure 10:
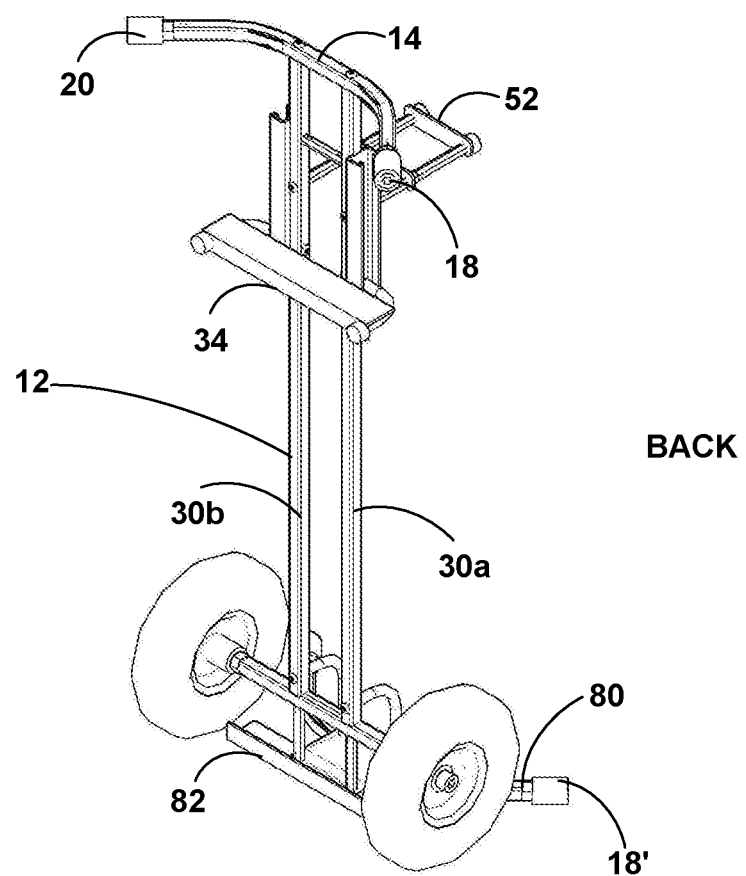
FIG. 10 is a block diagram illustrating a back perspective view of an exemplary modular configurable mobile transport apparatus.

FIG. 10 is a block diagram 116 illustrating a back perspective view of an exemplary modular configurable mobile transport apparatus 12.

FIG. 11 is a block diagram 118 illustrating a horizontal perspective view of an exemplary modular configurable mobile transport apparatus 12.

FIG. 12 is a block diagram 120 illustrating a side horizontal view of an exemplary modular configurable mobile transport apparatus 12.

Figure 13:
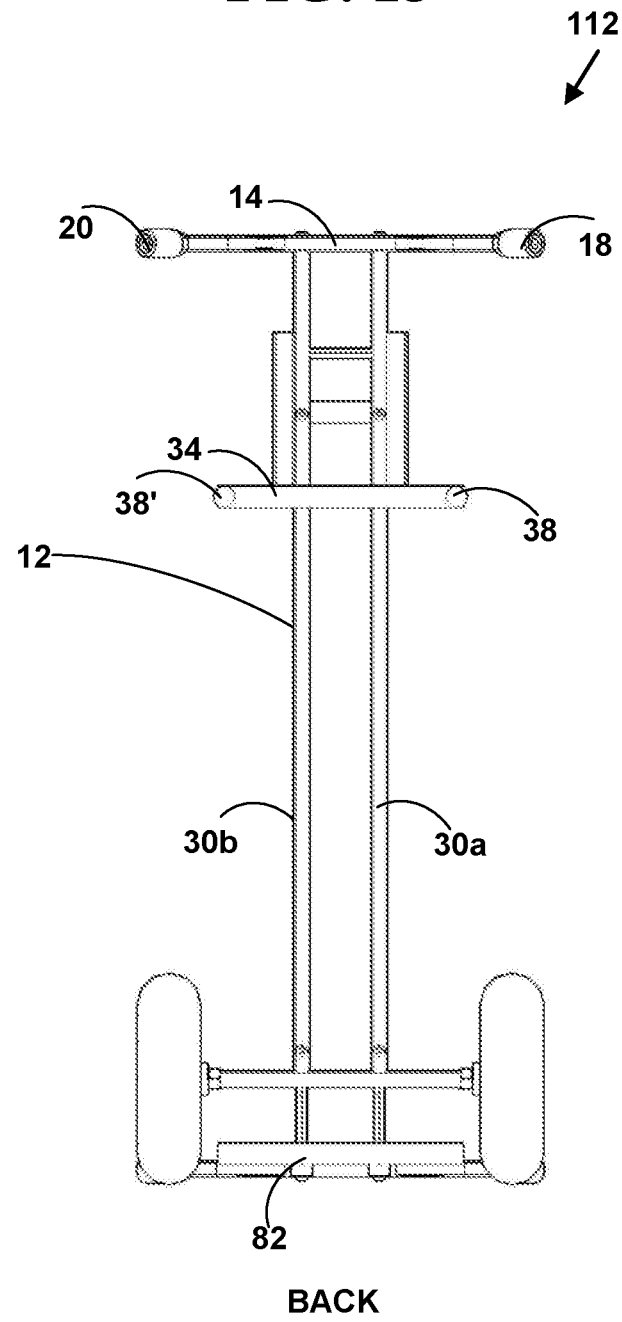
FIG. 13 is a block diagram illustrating a back view of an exemplary modular configurable mobile transport apparatus.

FIG. 13 is a block diagram 122 illustrating a back view of an exemplary modular configurable mobile transport apparatus 12.

Figure 14:
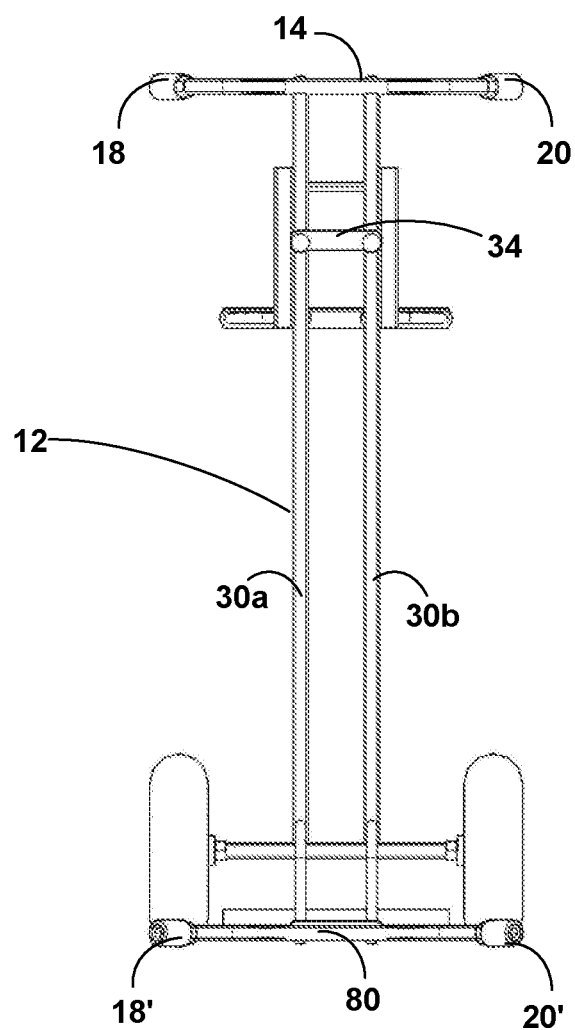
FIG. 14 is a block diagram illustrating a front view of an exemplary modular configurable mobile transport apparatus.

FIG. 14 is a block diagram 124 illustrating a front view of an exemplary modular configurable mobile transport apparatus 12.

FIG. 15 is a block diagram 126 illustrating a side horizontal view of an exemplary modular configurable mobile transport apparatus including a cutting saw tool 128 resting on a backwards facing roller tip handle 14.

In FIG. 15, the cutting saw tool 128 is attached to the apparatus 12 with via the forward facing securing and storing portion 52. In one exemplary embodiment, a selected pre-determined angle (e.g., up to about eighty-five degrees) of the first roller tip handle 14 along with the wheels 76, 76' of a coordinated size provides a work surface for tools attached to the apparatus 12 at an appropriate height 130 for easy use when the apparatus 12 is placed in a horizontal configuration resting on the first roller tip handle 14.

In another embodiment, the second roller time handle 80 along with the wheels 76, 76' of a coordinated size provides a work surface for tools attached to the apparatus 12 at an appropriate height. In such an embodiment, the cutting saw tool 128 is to the apparatus via the backward facing securing and storing portion 34. However, the present is not limited to such embodiments and other embodiments can be used to practice the invention.

Figure 16:
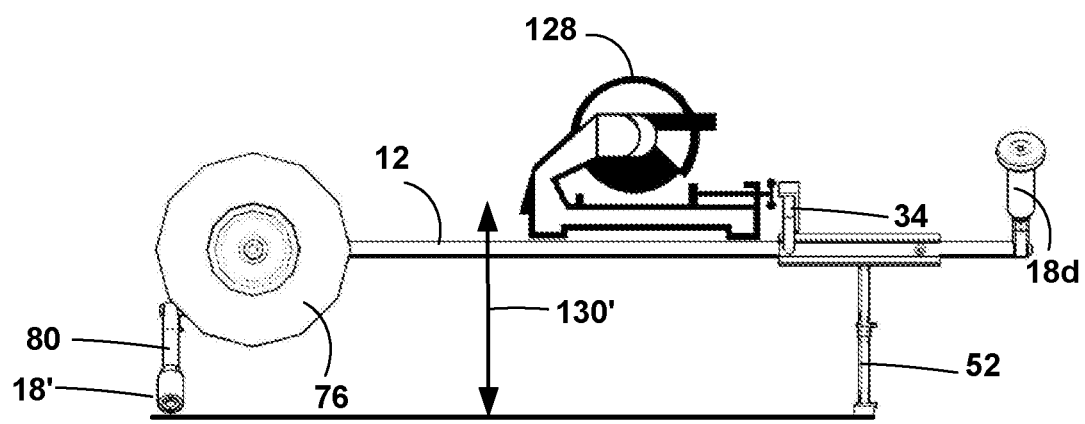
FIG. 16 is a block diagram illustrating a side horizontal view of an exemplary modular configurable mobile transport apparatus including a cutting saw tool resting on a forwards facing roller tip handle.

FIG. 16 is a block diagram 132 illustrating a side horizontal view of an exemplary modular configurable mobile transport apparatus 12 including a cutting saw tool 128 resting on a forwards facing roller tip handle 80.

In FIG. 16, the cutting saw tool 128 is attached to the apparatus 12 with via the backward facing securing and storing portion 34. In one exemplary embodiment, a selected pre-determined angle (e.g., up to about eighty-five degrees) of the second roller tip handle 80 along with the wheels 76, 76' of a coordinated size provides a work surface for tools attached to the apparatus 12 at an appropriate height 130' for easy use when the apparatus 12 is placed in a horizontal configuration resting on the second roller tip handle 80.

Figure 17:
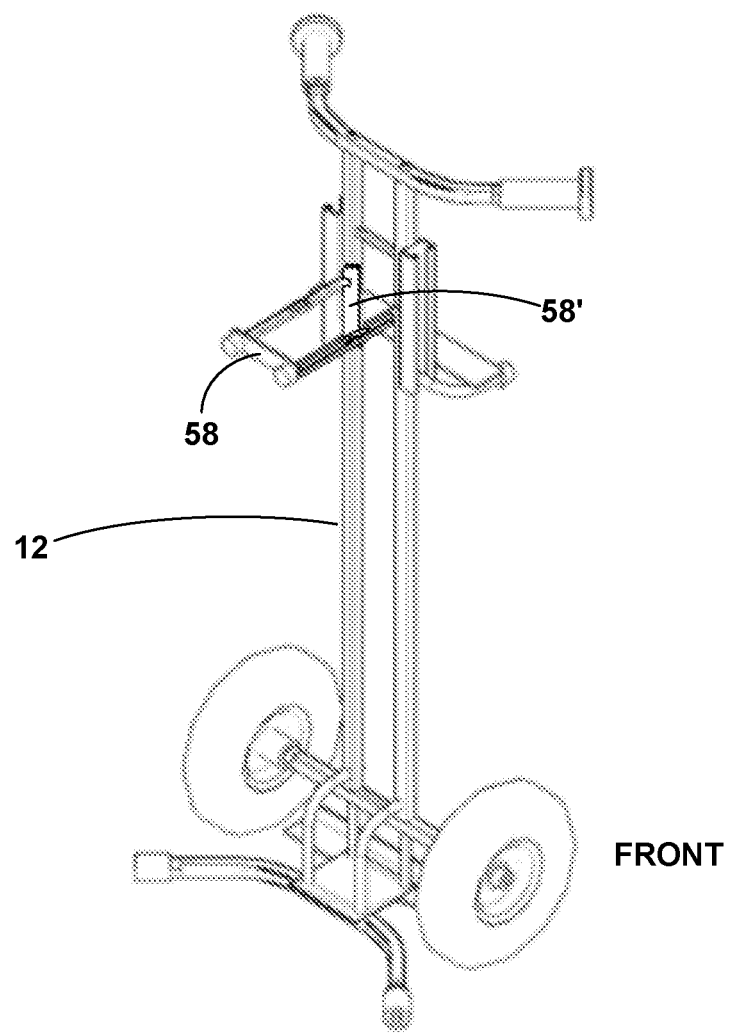
FIG. 17 is a block diagram illustrating a front perspective view of an exemplary modular configurable mobile transport apparatus with second latch plate in an open position.

FIG. 17 is a block diagram 134 illustrating a front perspective view of an exemplary modular configurable mobile transport apparatus 12 with second latch plate 58' in an open position.

In FIG. 17 the second latch plate 58' of the forward securing and storing portion 52 is in an open position and the first latch plate 58 is in a closed position.

In one exemplary embodiment and as FIG. 1 illustrates, both the configurable backwards facing securing and storing portion 34 and the configurable backwards facing securing and storing portion 52 are attached a pre-determined fixed positions on the plural first vertical support portions 30a, 30b on the main body portion 30.

In another exemplary embodiment, both the configurable backwards facing securing and storing portion 34 and the configurable backwards facing securing and storing portion 52 are attachable, detachable and movable to a plural positons on the plural first vertical support portions on the main body portion 30.

However, the present invention is not limited to such embodiments and other embodiments can be used to practice the invention.

The present invention includes a modular configurable mobile transport apparatus 12 with components made of various metals. The metal components, may be hardened, un-hardened and/or plated or un-plated. However, the present invention is not limited to such an embodiment and the present invention may include a modular configurable mobile transport apparatus 12 including individual components made from a combination of metal, plastic, wood, composite materials and/or other types of materials. The individual components of the modular configurable mobile transport apparatus 12 are individually manufactured, machined, 3D printed by a 3D printer, extruded and/or pultruded.

"Manufacturing" includes the process of making items from raw materials. "Machining" includes various processes in which a piece of raw material is cut into a desired final shape and size by a controlled material-removal process.

A "3D printer" includes 3D printing or "Additive manufacturing." 3D printing is a process of making a three-dimensional solid object of virtually any shape from a digital model. 3D printing is achieved using an "additive process," where successive layers of material (e.g., metal, plastic, etc.) are laid down in different shapes. 3D printing is also considered distinct from traditional manufacturing and/or machining techniques, which mostly rely on the removal of material by methods such as cutting or drilling and are "subtractive" processes.

"Extrusion" is a manufacturing process where a material such as aluminum, etc. is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material. "Pultruson" is a manufacturing process for producing continuous lengths of materials. Pultruson raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultruson process is normally continuous and highly automated. Reinforcement materials, such as roving, mat or fabrics, are positioned in a specific location using preforming shapers or guides to form a pultruson. The reinforcements are drawn through a resin bath where the material is thoroughly coated or impregnated with a liquid thermosetting resin. The resin-saturated reinforcements enter a heated metal pultruson die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultruson die to the exact shape of the die cavity. The laminate solidifies when cooled and it is continuously pulled through the pultruson machine and cut to the desired length. The process is driven by a system of caterpillar or tandem pullers located between the die exit and the cut-off mechanism.

The various attachment means are not limited to the attachment means described and also can include threaded and/or unthreaded shoulder bolts, shoulder pins, and/or threaded rods with nyloc nuts, lock nuts, double nuts and/or jam nuts, etc. A "jam nut" is a low profile type of nut, typically half as tall as a standard nut. It is commonly used as a type of locknut, where it is "jammed" up against a standard nut to lock the two in place. A "nyloc nut," also referred to as a nylon-insert lock nut, polymer-insert lock nut, or elastic stop nut, is a kind of locknut with a nylon collar that increases friction on the screw thread. However, the present invention is not limited to such attachments means embodiments and other types of bolts, pins, rods and nuts can be used as attachment means to practice the invention.

It should be understood that the architecture, materials, components, methods and systems described herein are not related or limited to any particular type of unless indicated otherwise architecture, materials, components, methods and systems. Various types of general purpose or specialized architecture, materials, components, methods and systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or elements may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A modular configurable mobile transport apparatus, comprising in combination:
a first roller tip handle connected to a top portion of a main configurable body of the apparatus, extending backwards from the apparatus, including a first roller tip handle body portion, bent at a pre-determined angle at both a first end and a second end for grasping the apparatus from behind when the apparatus is moved and for keeping the apparatus level on a horizontal surface, a first roller portion at the first end of the first roller tip handle body portion and second roller portion at the second end of the roller handle body portion for allowing the apparatus to be rolled upon the first roller portion and the second roller portion of first roller tip handle;
the main configurable body portion including a plurality of first vertical support portions of a first pre-determined length, wherein the plurality of first support vertical support portions are replaceable with other vertical support portions of other pre-determined lengths to re-configure the apparatus to transport objects of varying lengths and varying weights;
a configurable backwards facing securing and storing portion extending backwards from a back surface portion of the plurality of first vertical support portions of the main configurable body portion of the apparatus for securing one or more objects of varying widths to the back surface portion of the plurality of first vertical support portions of the main configurable body portion of the apparatus;
one or more strut side rails conned to one or more side portions of the main configurable body portion for accepting one or more work-stop apparatus for accepting and applying pressure to an end of an object to be cut on the apparatus;
a configurable forward facing securing and storing portion extending forwards from a front surface portion of the plurality of first vertical support portions of the main configurable body portion of the apparatus for securing one or more objects of varying widths to the front portion of the plurality of first vertical support portions of the main configurable body portion of the apparatus, the configurable forward facing securing and storing portion including a first storage portion of a first pre-determined area with a first adjustable latch plate for storing and securing one or more objects of varying widths to the front surface portion of the plurality of first vertical support portions of the main configurable body portion of the apparatus and a second storing portion of a second pre-determined fixed area with a second latch plate to store one or more other objects, the first storage portion separated from the second storing portion with the second latch plate,
wherein rotating the second latch plate up and away from the configurable forward facing securing and storing portion provides a forward facing storage area including the first pre-determined storage area and the second pre-determined storage area;
an axle connected to a bottom portion surface of the plurality of first vertical support portions of the main configurable body portion;
two wheels including a first wheel connected to a right side portion of the axle and a second wheel connected to a left side portion of the axle for allowing the apparatus to be rolled along the horizontal surface;
a foot plate connected to a top surface portion of a second roller handle and to a bottom surface portion of the axle and to a top surface portion of a backward facing adjustable bracket, the storage area of the foot plate including a same storage area as the second storage area of the second storage portion of the configurable forward facing securing and storing portion and provides a bottom storage surface for objects stored in the second storage portion of the configurable forward facing securing and storing portion;
the second roller tip handle connected to a bottom portion of the main configurable body of the apparatus, extending forward from the apparatus, including a second roller tip handle body portion, bent at a second pre-determined angle at both a first end and a second end supporting the apparatus in a vertical position and, a third roller portion at a first end of the second roller tip handle body portion and a fourth roller portion at the second end of the second roller tip handle body portion for allowing the apparatus to be rolled upon the third roller portion and the fourth roller portion of second roller tip handle; and
the backward facing adjustable bracket, adjustable inwards and outwards from a back side portion of the apparatus, the backward facing adjustable bracket providing an adjustable bottom surface portion for the one or more objects stored in the configurable backwards facing securing and storing portion for securing a bottom end of the one or more objects of varying widths to the back surface portion of the apparatus.

2. The modular configurable mobile transport apparatus of claim 1, wherein the pre-determined angle and the second pre-determined angle includes at least an angle of forty-five degrees measured from a horizontal plane.

3. The modular configurable mobile transport apparatus of claim 1, wherein the first roller portion and the second roller portion of the first roller tip handle and the third roller portion and fourth roller portion of the second roller tip handle include a round, oval, conical, spherical, elliptical or hand-gripe palm protector shape, roller portions, or a combination thereof.

4. The modular configurable mobile transport apparatus of claim 1, wherein the plurality of first vertical support portions of the main configurable body portion include a plurality of receptacles at different distances on the front, back and side surface portions to attach both the configurable backwards facing securing and storing portion and the configurable backwards facing securing and storing portion at different distances on the plural first vertical support portions of the main configurable body portion to accommodate different sized and shaped objects.

5. The modular configurable mobile transport apparatus of claim 1, wherein the configurable backwards facing securing and storing portion includes one or more securing adjustment nobs to move an angled plate portion forwards towards and backwards away from plurality of first vertical support portions of the main configurable body portion of the apparatus for securing one or more objects of varying widths to the back surface portion of the plurality of first vertical support portions of the main configurable body portion of the apparatus.

6. The modular configurable mobile transport apparatus of claim 5, wherein the angled plate portion includes a plate with a ninety degree angle.

7. The modular configurable mobile transport apparatus of claim 1, wherein the first pre-determined storage area and the second pre-determined storage area includes identical sized storage areas.

8. The modular configurable mobile transport apparatus of claim 1, wherein the first pre-determined storage area and the second pre-determined storage area includes different sized storage areas.

9. The modular configurable mobile transport apparatus of claim 1 wherein the two wheels include tires with tubes, tubeless tires, solid tires, air pneumatic tire or solid pneumatic tires.

10. The modular configurable mobile transport apparatus of claim 9 wherein the solid tires include tire made from rubber, plastic, metal wood, or composite materials.

11. The modular configurable mobile transport apparatus of claim 1, wherein the foot plate provides additional horizontal stability for the apparatus.

12. The modular configurable mobile transport apparatus of claim 1, wherein pre-determined angle for the first roller tip handle and the second pre-determined angle for the second roller tip handle are a same angle.

13. The modular configurable mobile transport apparatus of claim 1, wherein pre-determined angle for the first roller tip handle and the second pre-determined angle for the second roller tip handle are a different angle.

14. The modular configurable mobile transport apparatus of claim 1, wherein the third roller portion and the fourth roller portion of the second roller tip handle are a same size and shape as the first roller and the second roller portion of the first roller tip handle portion.

15. The modular configurable mobile transport apparatus of claim 1, wherein the third roller portion and the fourth roller portion of the second roller tip handle are a different size and shape then the first roller and the second roller portion of the first roller tip handle portion.

16. The modular configurable mobile transport apparatus of claim 1, wherein the axle includes a pre-determined length long enough to secure and store tools for construction, maintenance, or manufacturing industries without the tools rubbing against the wheels of the apparatus.

17. The modular configurable mobile transport apparatus of claim 1, wherein individual components of the apparatus include metal, rubber, plastic, wood or composite materials or a combination thereof.

18. The modular configurable mobile transport apparatus of claim 1, wherein individual components of the apparatus are 3D printed, manufactured, extruded or pultruded, or a combination thereof.

19. The modular configurable mobile transport apparatus of claim 1, wherein the pre-determined angle of the first roller tip handle and the two wheels of a coordinated size provides a work surface for tools attached to the apparatus at an appropriate height for easy use when the apparatus is placed in a horizontal configuration resting on the first roller tip handle.

20. The modular configurable mobile transport apparatus of claim 1, wherein both the configurable backwards facing securing and storing portion and the configurable backwards facing securing and storing portion are attachable, detachable and movable to a plurality of positons on the plurality of first vertical support portions on the main body portion.

* * * * *